United States Patent
Nishida

(10) Patent No.: US 8,842,193 B2
(45) Date of Patent: Sep. 23, 2014

(54) IMAGING APPARATUS

(71) Applicant: Canon Kabushiki Kaisha, Tokyo (JP)

(72) Inventor: Tokuro Nishida, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 2 days.

(21) Appl. No.: 13/858,233

(22) Filed: Apr. 8, 2013

(65) Prior Publication Data

US 2013/0265469 A1    Oct. 10, 2013

(30) Foreign Application Priority Data

Apr. 10, 2012  (JP) ................. 2012-089696

(51) Int. Cl.
*H04N 5/228*    (2006.01)
*H04N 5/232*    (2006.01)
*H04N 5/225*    (2006.01)

(52) U.S. Cl.
CPC ......... *H04N 5/2258* (2013.01); *H04N 5/23245* (2013.01)
USPC ..................................... 348/222.1

(58) Field of Classification Search
USPC ................................ 348/513, 518
See application file for complete search history.

(56) References Cited

U.S. PATENT DOCUMENTS

| | | | | |
|---|---|---|---|---|
| 6,614,846 | B1 * | 9/2003 | Fujiwara et al. | 375/240.16 |
| 6,784,940 | B1 * | 8/2004 | Takazawa et al. | 348/388.1 |
| 7,898,575 | B2 * | 3/2011 | Ishii | 348/222.1 |
| 8,300,114 | B2 * | 10/2012 | Lam | 348/222.1 |
| 8,422,547 | B2 * | 4/2013 | Yamashita | 375/240 |
| 8,687,079 | B2 * | 4/2014 | Kobayashi et al. | 348/222.1 |
| 2010/0149412 | A1 * | 6/2010 | Yamashita | 348/443 |
| 2011/0254917 | A1 * | 10/2011 | Schaffer et al. | 348/43 |

FOREIGN PATENT DOCUMENTS

JP                11-98396 A    4/1999

* cited by examiner

*Primary Examiner* — Albert Cutler
(74) *Attorney, Agent, or Firm* — Canon U.S.A., Inc. IP Division

(57) ABSTRACT

There is provided an imaging apparatus including a generating unit for generating a first and a second moving image signals, each at 30 frames per second, from 60-frames-per-second moving image signals output from an image capture unit, a plurality of output units for outputting moving image signals in accordance with a Serial Digital Interface format, and a control unit for controlling an output operation by a first output unit and a second output unit such that the second moving image signal is output by the second output unit in parallel with an output of the first moving image signal by the first output unit, wherein the control unit controls output timings of the first and the second moving image signals such that a frame included in the first moving image signal and the second moving image signal is output at an identical timing.

5 Claims, 4 Drawing Sheets

IMAGING APPARATUS

BACKGROUND OF THE INVENTION

1. Field of the Invention

The present invention relates to an imaging apparatus, and particularly, to control performed when a captured moving image signal is output.

2. Description of the Related Art

Traditionally, in an imaging apparatus that captures an moving image, a captured moving image signal goes through various processing circuits such as for correction processing for a characteristic of an image sensor and conversion processing for the format of moving image signals, before it is output to the outside of the apparatus. This causes a delay between an image being viewed by the naked eye and an image output by an imaging apparatus.

There has been proposed, for example, an apparatus that has a route to output a captured image in real time and another route to output an image signal with a delay (see Japanese Patent Application Laid-Open No. 11-98396, for example).

In recent years, the frame rate and the number of pixels for a moving image that an imaging apparatus can capture have been increased. This has led to an increased data amount (data rate) of moving image signals to be output, which sometimes exceeds a data rate specified for a format, such as of SDI (Serial Digital Interface), to which uncompressed moving images are output.

To cope with this challenge, original moving image signals of one channel could be output by using a plurality of channels.

However, a frame delay, caused when moving images are output by using the plurality of channels, has not been considered.

SUMMARY OF THE INVENTION

The present invention has been developed in light of such a problem, and it is therefore an object of the present invention to be able to appropriately control a delay of a moving image signal when moving image signals are output by using a plurality of channels.

As an aspect of the present invention, a configuration as described below is presented.

An imaging apparatus comprising:

an image capture unit configured to outputs 60 frames of moving image signals per second;

a generating unit configured to generate a first channel of moving image signals and a second channel of moving image signals, each channel of signals at 30 frames per second, from the 60-frames-per-second moving image signals output from the image capture unit, the generating unit assigning an even frame of the 60-frames-per-second moving image signals output from the image capture unit to the first channel of moving image signals and an odd frame thereof to the second channel of moving image signals;

a plurality of output units each configured to output moving image signals in agreement with a Serial Digital Interface format, the plurality of output units comprising a first output unit configured to output the first channel of moving image signals generated by the generating unit and a second output unit configured to output the second channel of moving image signals generated by the generating unit; and a control unit configured to control an output operation by the first output unit and the second output unit such that the second channel of moving image signals is output by the second output unit in parallel with an output of the first channel of moving image signals by the first output unit, wherein the control unit controls an output timing of the first channel of moving image signals and an output timing of the second channel of moving image signals such that a frame included in the first channel of moving image signals and a frame included in the second channel of moving image signals are output at an identical timing.

Further features of the present invention will become apparent from the following description of exemplary embodiments (with reference to the attached drawings).

DESCRIPTION OF THE EMBODIMENTS

Figure 1:
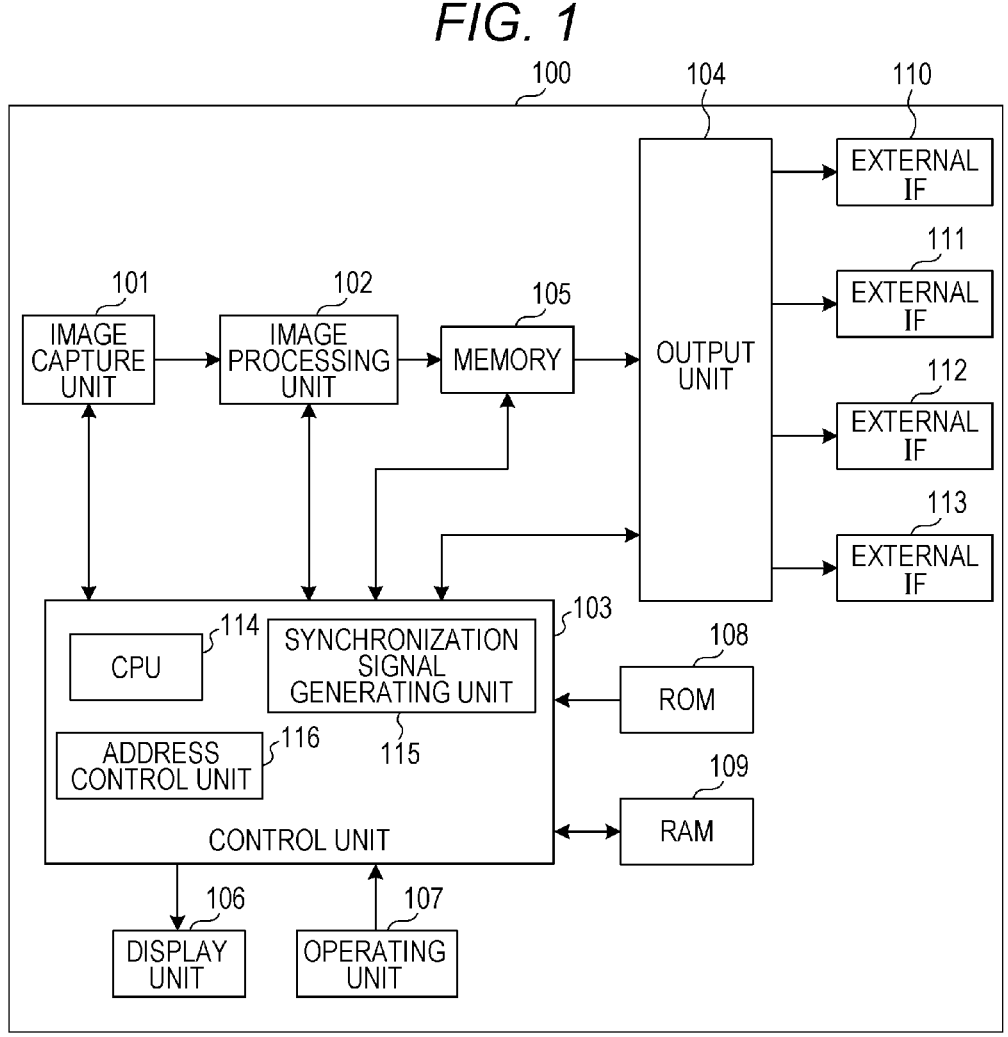
FIG. 1 is a block diagram of an imaging apparatus according to an embodiment of the present invention.

Some embodiments of the present invention will now be described in detail with reference to the drawings. FIG. 1 is a block diagram of a configuration of an imaging apparatus 100 according to an embodiment of the present invention.

With reference to FIG. 1, an image capture unit 101, which includes a lens and an image sensor, captures an object image to acquire a moving image signal. A frame rate (the number of frames per unit time) and the number of pixels for moving image signals to be acquired by the image capture unit 101 are controlled by a control unit 103. An image processing unit 102 performs various types of processing on the moving image signal acquired by the image capture unit 101. For example, the image processing unit 102 processes the correction of a gain characteristic of each pixel of the image sensor, the correction of white balance, the correction of insufficient marginal illumination caused by a difference in shape between the lens and the image sensor. The image processing unit 102 outputs the moving image signal that has undergone the various types of processing to a memory 105. The memory 105 includes an SDRAM and a memory control unit that controls writing and reading of a signal in and from the SDRAM. The memory 105 writes and reads the moving image signal under the control of the control unit 103.

The control unit 103, which includes a CPU 114, controls the various units of the imaging apparatus 100 in agreement with a program (software) stored in a ROM 108. Particularly, for the image capture unit 101, the control unit 103 performs zoom control and focus control for the lens module, and generates a driving synchronization signal and sets the capture frame rate for the image sensor. For the image processing unit 102, the control unit 103 controls the various corrections, and sends and receives a control parameter. For the memory 105, the control unit 103 sets a write address and controls the writing and the reading. For an output unit 104, the control unit 103 generates a synchronization signal to output the moving image signal from external interfaces (IFs) 110 to 113 and turns ON/OFF the outputting. The control unit 103 also allows a moving image from the image capture unit 101 and various types of information to be displayed at a display unit 106. In addition, the control unit 103 includes a synchronization signal generating unit 115 that generates various synchronization signals and the like for controlling the timing of writing and reading the moving image signal by the memory 105. Furthermore, the control unit 103 includes an address control unit 116 to control a frame address for writing and reading the moving image signal to and from the memory 105.

The output unit 104 outputs the moving image signal read from the memory 105 through the external IFs 110 to 113 and a predetermined transmission path to the outside of the apparatus. The external IFs 110 to 113 each output a moving image signal in agreement with an SDI format. For SDI, a transmission format is strictly standardized by SMPTE (Society of Motion Picture and Television Engineers). For example, a sampling structure, a pixel depth, and a frame rate are specified. In the case of the 3G-SDI standard, it is specified that moving image signals that can be output should be up to 30 frames per second (fps) for an angle of view of 1920 horizontal pixels ×1080 vertical pixels and a sampling structure of RGB444.

The output unit 104 changes moving image signals read from the memory 105 such that the signals conform to a transmission format, and then outputs the signals to the external IFs 110 to 113. Here, it is possible to output the moving image signals through one or all of the external IFs 110 to 113. A user can operate an operating unit 107 to select from the external IFs for outputting the moving image signals.

The display unit 106, which includes a display device such as a liquid crystal panel, displays the moving image acquired by the image capture unit 101 and the various types of information. The operating unit 107 includes an assortment of buttons, switches, and the like that the user can operate. The ROM 108 stores an operating program for the CPU 114. A RAM 109 is used as a work memory by the control unit 103. A recording unit 117 records moving image data output from the image processing unit 102 in a recording medium (not shown) such as a memory card.

Processing to output the moving image signals captured by the imaging apparatus 100 to the outside will now be described. In the present embodiment, the number of pixels for the moving image signals to be captured by the image capture unit 101 is assumed to be 1920 horizontal pixels× 1080 vertical pixels. Also, the technique used to read the image signals from the image sensor in the image capture unit 101 is assumed to be progressive. In addition, it is assumed that the ratio of R, G, and B pixels that are included in the moving image signals output from the image capture unit 101 is 4:4:4, and that a digital signal has 10 bit per pixel. In the present embodiment, a user can choose, at discretion, the frame rate for the moving image to be captured between 60 fps and 30 fps. In the present embodiment, a mode in which the image capture unit 101 outputs 60-fps moving image signals is defined as a first mode, and a mode in which the image capture unit 101 outputs 30-fps moving image signals is defined as a second mode. In the present embodiment, the recording unit 117 records the moving image data output from the image processing unit 102 in a recording medium as one stream of moving image signals in either the first mode or the second mode.

Figure 2:
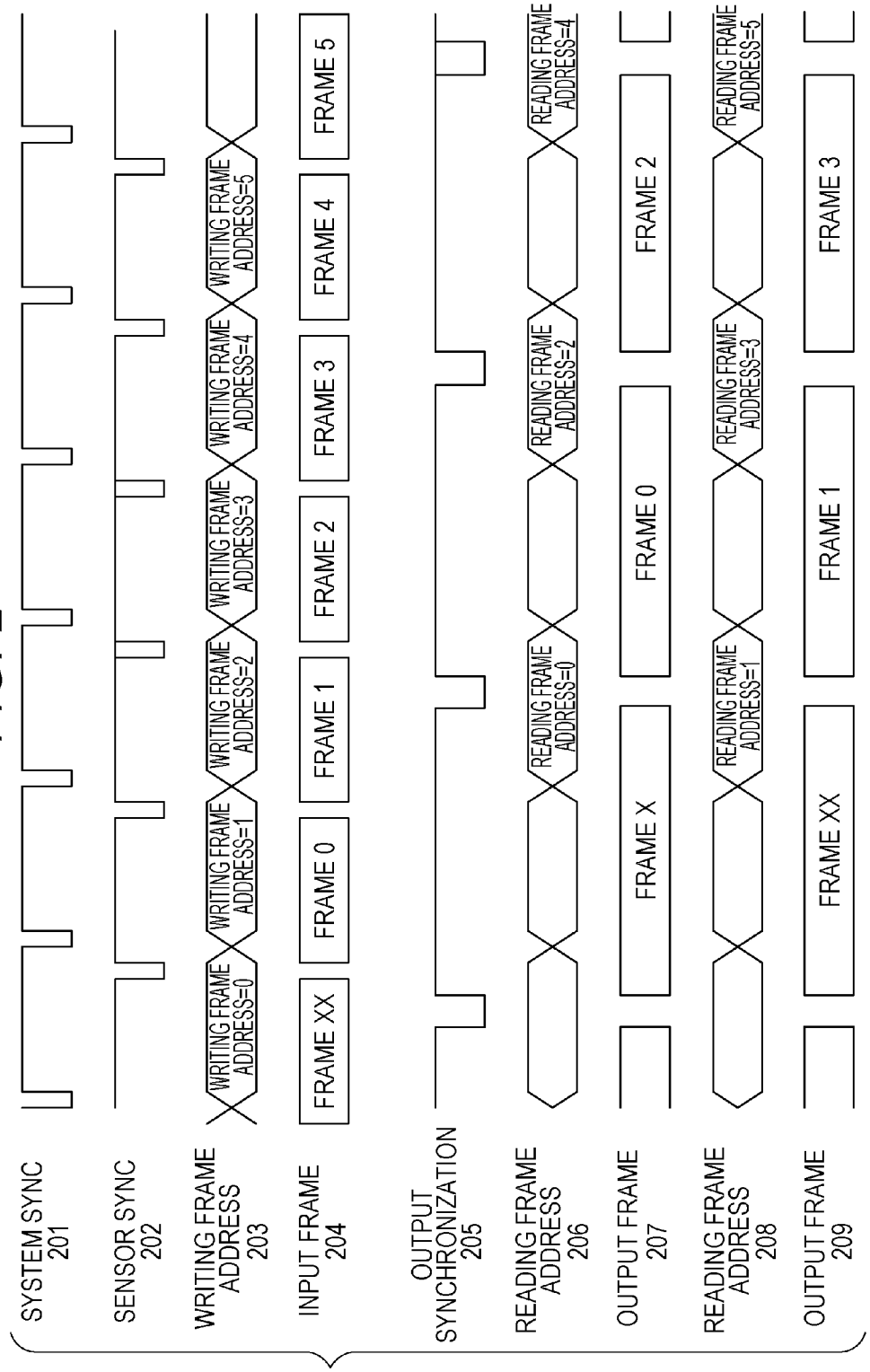
FIG. 2 is a timing chart for outputting 60-fps moving image signals according to an embodiment of the present invention.
Figure 3:
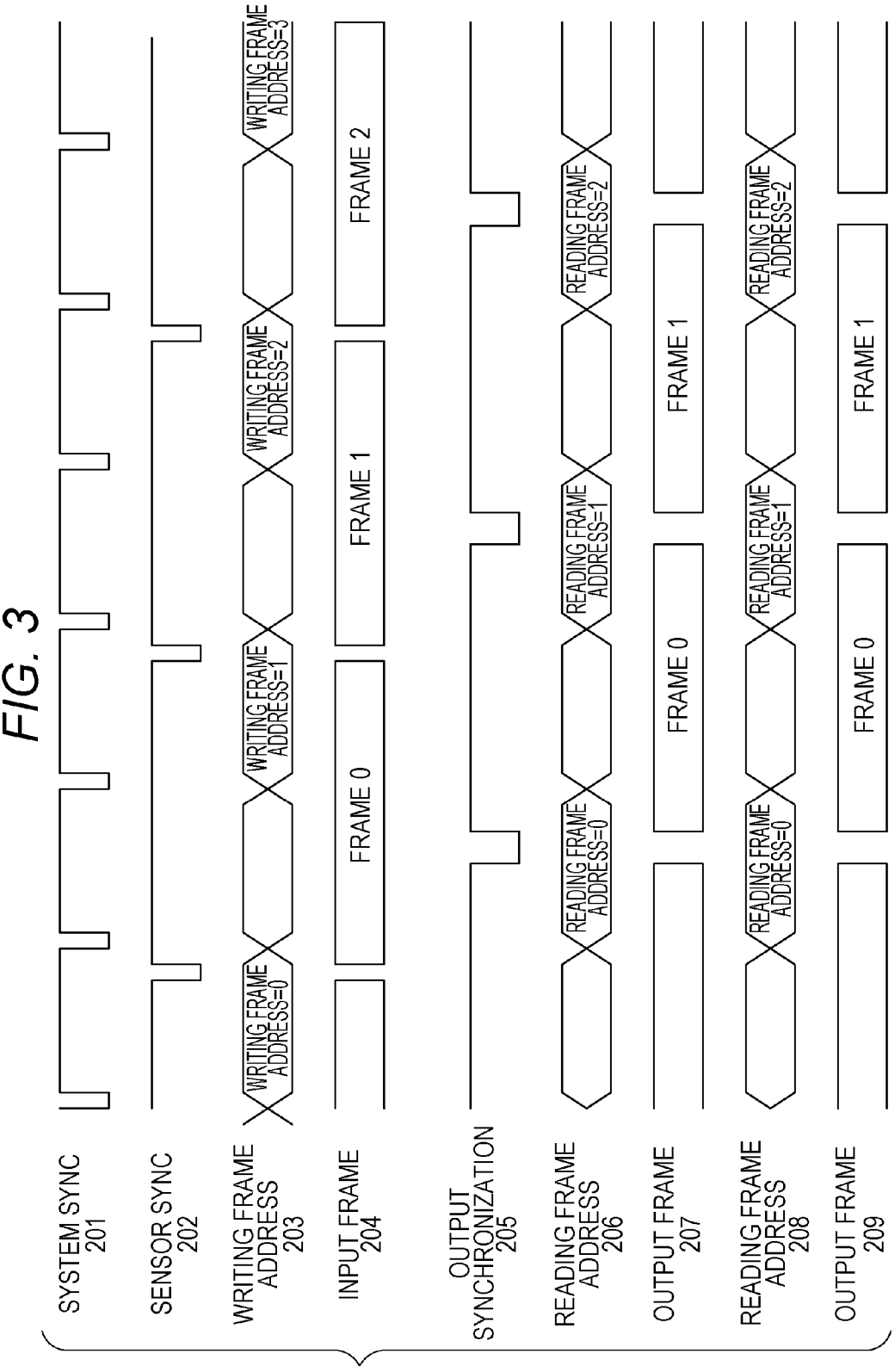
FIG. 3 is a timing chart for outputting 30-fps moving image signals according to an embodiment of the present invention.

FIGS. 2 and 3 are operation timing charts for the imaging apparatus 100. FIG. 2 is a timing chart of an operation in the case where a user chooses the first mode. FIG. 3 is a timing chart of an operation in the case where the user chooses the second mode. The 3G-SDI standard disallows the outputting of 60-fps moving images with 1920 horizontal pixels×1080 vertical pixels and the sampling structure of RGB 4:4:4. Hence, in the present embodiment, in the case where the moving image is captured at 60 fps, one stream of 60-fps moving image signals is used to generate two streams of moving image signals that will then be output. In the case where the moving image is captured at 30 fps, 30-fps moving image signals are output as one stream of moving image signals.

In FIGS. 2 and 3, a SYSTEM SYNC 201 represents a synchronization signal used as an internal reference in the imaging apparatus 100. The present embodiment assumes that the SYSTEM SYNC 201 has a frequency of 60 Hz. The control unit 103 outputs an instruction to the various blocks in conformity with the SYSTEM SYNC 201. A SENSOR SYNC 202 represents a synchronization signal for driving the image sensor of the image capture unit 101. Electrical information is read from the image sensor in synchronization with the SENSOR SYNC 202. The SYSTEM SYNC 201 and the SENSOR SYNC 202 are in synchronization with each other with a certain phase difference. A writing frame address 203 provides information of a writing frame number that is output by the control unit 103 to the memory 105. Each frame of moving image signals sent from the image processing unit 102 is written at a specified address of the memory 105 in accordance with this frame number. The control unit 103 outputs the frame number in synchronization with the SYSTEM SYNC 201, and the memory 105 acquires the writing frame address in synchronization with the SENSOR SYNC 202. The capacity of the memory 105 determines the number of frames that can be stored. Hence, the control unit 103 sets a value for the frame address such that moving image signals stored in the memory 105 remain within the capacity.

An input frame 204 represents a frame that is read from the image capture unit 101 and is then written in the memory 105. The image capture unit 101 outputs each frame of moving image signals in synchronization with the SENSOR SYNC 202. Each frame of moving image signals that has been output by the image capture unit 101 will be output to the memory 105 with a delay corresponding to a time taken for the processing by the image processing unit 102. Note that the delay time by the image processing unit 102 is a predetermined time, which is much shorter than a frame cycle.

An output synchronization signal 205 is a synchronization signal for outputting the moving image signals. For outputting RGB 444 and 10-bit moving image signals with the capture angle of view of 1920×1080 in agreement with the 3G-SDI standard, the frame rate for one stream of moving image signals is 30 fps at maximum. The frequency of the output synchronization signal 205 is therefore 30 Hz. The SYSTEM SYNC 201 and the output synchronization signal 205 are in synchronization with each other with a certain phase difference.

Reading frame addresses 206 and 208 each provide information of a reading frame number sent from the control unit 103 to the memory 105. The control unit 103 outputs the frame number in synchronization with the SYSTEM SYNC 201, and the memory 105 acquires the frame address in synchronization with the output synchronization signal 205. According to this frame address, the moving image signals are read from the memory 105. Output frames 207 and 209 represent the moving image signals read from the memory 105. Each output frame is in synchronization with the output synchronization signal 205. Note that a writing command and a reading command for the memory 105 are also output by the control unit 103.

It is understood that, since the moving image signals that have been acquired by the image capture unit 101 are stored in the memory 105 temporarily as described above, a delay is caused before the signals are output.

Processing for the first mode where the 60-fps moving image is captured by the image capture unit 101 and then output will now be described with reference to FIG. 2. Since the frame rate for the moving image is 60 fps, the SYSTEM SYNC 201 and the SENSOR SYNC 202 have an identical frequency. The control unit 103 outputs the writing frame address 203 to the memory 105 in synchronization with the SYSTEM SYNC 201. The memory 105 stores each frame of moving image signals in synchronization with the SENSOR SYNC 202. In other words, 60 frames of moving image signals are written in the memory 105 per second. The control unit 103 performs control such that the moving image signals written in the memory 105 remain within the capacity of the memory 105 in a manner depending on the capacity.

The 60-fps moving image signals that have been written in the memory 105 as described above will be read as two streams of moving image signals, and then output through any two of the external IFs 110 to 113. The moving image signals are segmented per frame into a first stream and a second stream, with even frames assigned to the first stream and odd frames assigned to the second stream. In other words, the moving image signals in one stream that have been acquired are assigned alternately per frame to two streams of moving image signals.

In the present embodiment, a common output synchronization signal 205 is generated for each stream of moving image signals. Conversely, the independent reading frame address 206 or 208 is generated and output for each stream of moving image signals. Such a configuration can control the delay time such that output timings for a frame in the streams of moving image signals are identical.

In FIG. 2, following the completion of the writing of frame 0 of the signals in the memory 105, the writing of frame 1 is started. Before the writing of frame 1 is completed, the reading from the memory 105 of frame 0 and frame 1 is started. In other words, of an even frame and an odd frame to be output simultaneously into two streams of moving image signals, the even frame is written in the memory 105, and then the succeeding odd frame is written in the memory 105. Before the writing of the odd frame is completed, the even frame and the odd frame are read. Here, odd frames may be assigned to the first stream and even frames are assigned to the second stream. In this case, of an even frame and an odd frame to be output simultaneously, the odd frame is written in the memory 105, and then the succeeding even frame is written. Before the writing of the even frame is completed, the even frame and the odd frame are read. In other words, control is performed such that, of a plurality of frames to be output simultaneously, before the writing in the memory 105 of the final frame is completed, the plurality of frame is read.

In this case, since the output synchronization signal 205 has a frequency lower than that of the SENSOR SYNC 202, a frame number to be read from the memory 105 remains smaller than a frame number being written.

As described above, in the case where 60-fps moving images are captured by the image capture unit 101, this one stream of moving images is segmented into a plurality of streams of moving images each having a frame rate of 30 fps, which is lower than 60 fps. Here, control is performed such that a frame included in each stream of moving images is output at an identical timing (phase), thereby allowing two streams of moving image signals to be output with a common output synchronization signal. This precludes a demand to generate a synchronization signal for each stream, allowing a reduced scale of circuitry for generating a synchronization signal.

Processing for the second mode where the 30-fps moving image is captured by an image capture unit 101 and then output will now be described with reference to FIG. 3. FIG. 3 is a diagram of the case where two of external IFs 110 to 113 are used to simultaneously output the moving image signals, the signals being 30-fps signals for the two IFs. Note, however, that a configuration to output one stream of moving image signals may, of course, also be used.

Since the frame rate of the moving image signals output by the image capture unit 101 is 30 fps, a SENSOR SYNC 202 provides a synchronization signal at half the frequency of a SYSTEM SYNC 201. A control unit 103 outputs a writing frame address in synchronization with the SYSTEM SYNC 201, and in the case of FIG. 3, a writing frame address is output for every other SYSTEM SYNC 201. A memory 105 stores each frame of moving image signals in synchronization with the SENSOR SYNC 202. In other words, 30 frames of moving image signals are written in the memory 105 per second. Similarly to the first mode, the control unit 103 performs control such that the moving image signals written in the memory 105 remain within the capacity of the memory 105.

In the second mode, since the frame rate of the moving image signals output by the image capture unit 101 is 30 fps, the moving image data from the image capture unit 101 can be output as one stream of moving image signals through any one of the external IFs 110 to 113. The moving image signals may also be output through two of the external IFs 110 to 113 simultaneously, the signals being 30-fps signals for the two IFs. The control unit 103 outputs an identical value to a reading frame address 206 for the first stream and to a reading frame address 208 for the second stream.

In FIG. 3, writing in the memory 105 of the signals of frame 0 is started, and before the writing is completed, reading from the memory 105 of the signals of frame 0 is started, which signals are output as the first stream and the second stream of moving image signals. Since an output synchronization signal 205 has a frequency lower than that of the SENSOR SYNC 202, a frame number to be read from the memory 105 remains smaller than a frame number being written.

As described above, in the second mode where the 30-fps moving image is captured by the image capture unit 101, the moving image signals can be output with a minimum delay time.

Figure 4:
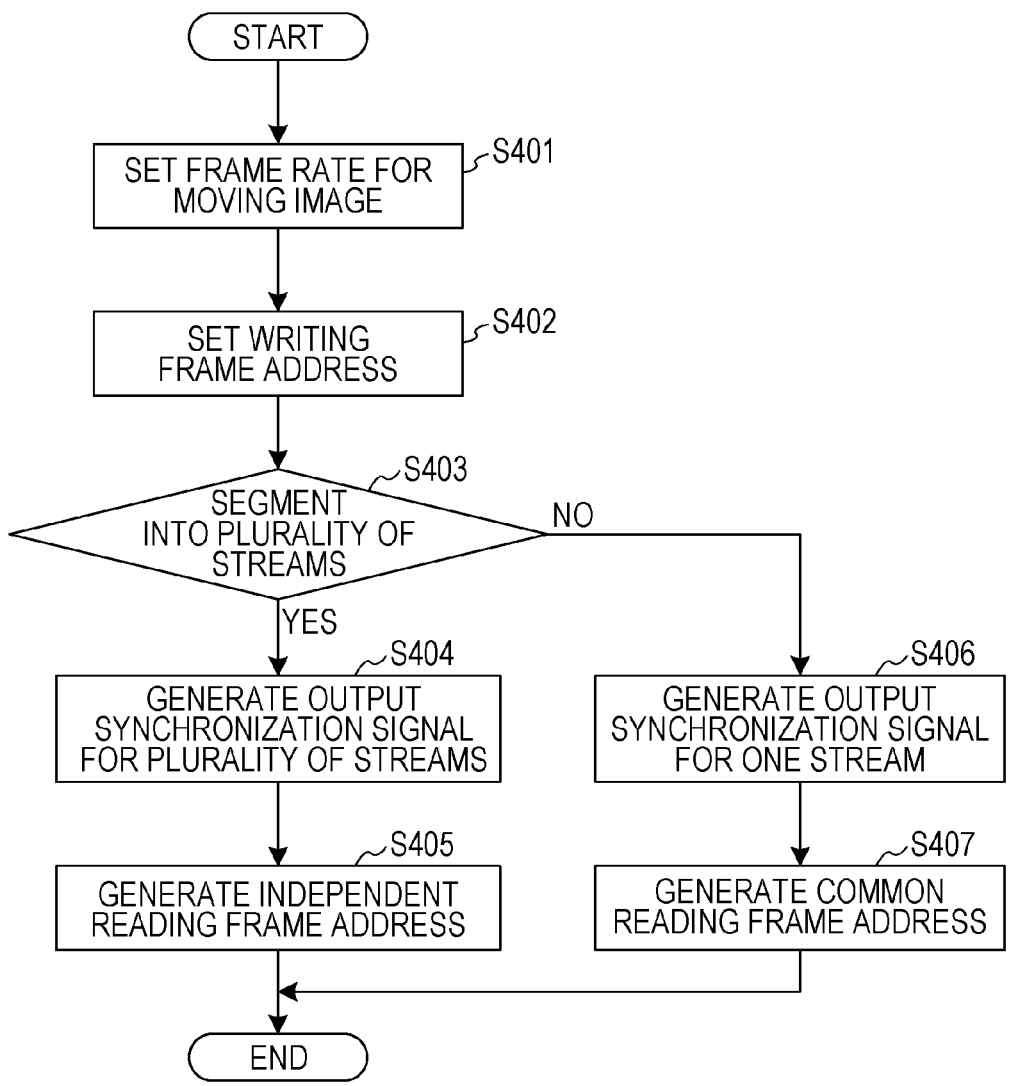
FIG. 4 is a flowchart of output processing for moving image signals according to an embodiment of the present invention.

The operations elaborated above will now be described with reference to the flowchart of FIG. 4. FIG. 4 is a flowchart of control on an output timing to output a captured moving image to the outside. Processing in FIG. 4 is performed by the control unit 103.

When a user operates an operating unit 107 to turn on the power switch, a control unit 103 sets the frame rate of a moving image to a predetermined frame rate. A moving image captured at this predetermined frame rate is displayed at the display unit 106. At this point, the user operates the operating unit 107 to choose from a first mode and a second mode in order to set the frame rate for a moving image to be captured (S401). When the frame rate for a moving image has been set, the control unit 103 sets a writing frame address in a manner dependent on the frame rate that has been set (S402). The control unit 103 then determines, in accordance with the mode that has been set, whether or not to segment the captured moving image signals into a plurality of streams of moving image signals before the signals are output (S403).

As described above, when a moving image having a frame rate of 60 fps is to be output in agreement with 3G-SDI, the image should be segmented into two streams of moving image signals before the signals are output. In this case, as an output synchronization signal for outputting each stream of moving image signals, the control unit 103 generates an output synchronization signal for the plurality of streams of moving image signals (S404). At this point, of an even frame and an odd frame to be output simultaneously into the two streams of moving image signals, the output synchronization signal is generated such that the even frame and the odd frame are read before writing of the odd frame in the memory 105 is completed. The control unit 103 also generates an independent reading frame address to output each stream of moving image signal (S405).

Conversely, when it is possible to output the captured moving image signals without segmenting the signals into a plurality of streams, the control unit 103 generates one output synchronization signal (S406). For example, as illustrated in FIG. 3, even in the case where identical moving image signals are output through a plurality of external IFs, the control unit 103 generates and outputs a common output synchronization signal for the moving image signals to be output through each external IF. In addition, the control unit 103 generates one reading frame address (S407). For example, as illustrated in FIG. 3, even in the case where identical moving image signals are output through a plurality of external IFs, the control unit 103 generates and outputs a common reading frame address for the moving image signals to be output through each external IF.

The present embodiment has disclosed a configuration that segments 60-fps moving image signals into two streams of moving image signals to output the signals. However, another configuration, which segments moving image signals at a different frame rate into three or more streams of moving image signals to output the signals, may be employed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-089696, filed Apr. 10, 2012, which is hereby incorporated by reference herein in its entirety.

What is claimed is:

1. An imaging apparatus comprising:
    an image capture unit configured to output 60 frames of moving image signals per second;
    a generating unit configured to generate a first moving image signal and a second moving image signal, each signal at 30 frames per second, from the 60-frames-per-second moving image signals output from the image capture unit, the generating unit assigning an even frame of the 60-frames-per-second moving image signals output from the image capture unit to the first moving image signal and an odd frame thereof to the second moving image signal;
    a plurality of output units each configured to output moving image signals in accordance with a Serial Digital Interface format, the plurality of output units comprising a first output unit configured to output the first moving image signal generated by the generating unit and a second output unit configured to output the second moving image signal generated by the generating unit; and
    a control unit configured to control an output operation by the first output unit and the second output unit such that the second moving image signal is output by the second output unit in parallel with an output of the first moving image signal by the first output unit,
    wherein the control unit controls an output timing of the first moving image signal and an output timing of the second moving image signal such that a frame included in the first moving image signal and a frame included in the second moving image signal are output at an identical timing.

2. An apparatus according to claim 1, wherein
    the generating unit stores, in a storage unit, an even frame of the 60-frames-per-second moving image signals output by the image capture unit, and stores, in the storage unit, an odd frame of the 60-frames-per-second moving image signals output by the image capture unit at a timing different from that of the even frame,
    the first output unit outputs the first moving image signal that includes the even frame read from the storage unit, and outputs the second moving image signal that includes the odd frame read from the storage unit, and
    the control unit controls a reading timing, from the storage unit, of the even frame and a reading timing, from the storage unit, of the odd frame such that the even frame and the odd frame are read at an identical timing.

3. An apparatus according to claim 2, wherein
    the control unit controls reading, from the storage unit, of one even frame and a succeeding odd frame in the 60-frames-per-second moving image signals output by the image capture unit such that the even frame is stored in the storage unit, then the succeeding odd frame is stored in the storage unit, but before the storing of the odd frame is completed, the reading, from the storage unit, of the even frame and the odd frame is started.

4. An apparatus according to claim 1, further comprising
    a setting unit configured to set one of a first mode in which the image capture unit outputs the 60-frames-per-second moving image signals, and a second mode in which the image capture unit generates 30-frames-per-second moving image signals,
    wherein, in the first mode, the control unit controls the first output unit and the second output unit such that the second moving image signal is output by the second output unit in parallel with an output of the first moving image signal by the first output unit, and, in the second mode, the control unit controls the first output unit and the second output unit such that the 30-frames-per-second moving image signals output from the image capture unit are output simultaneously from the first output unit and the second output unit 5. An apparatus according to claim 1, wherein
    a ratio of red, green, and blue pixels included in the 60-frames-per-second moving image signals output from the image capture unit is 4:4:4, and data of each pixel is 10-bit digital data.

* * * * *